United States Patent [19]

Fletcher et al.

[11] 4,061,041

[45] Dec. 6, 1977

[54] DIFFERENTIAL SOUND LEVEL METER

[76] Inventors: James C. Fletcher, Administrator of the National Aeronautics and Space Administration, with respect to an invention of; Allan J. Zuckerwar, Newport News, Va.

[21] Appl. No.: 740,156

[22] Filed: Nov. 8, 1976

[51] Int. Cl.² ............................................. G01H 3/12
[52] U.S. Cl. ...................................... 73/646; 330/52
[58] Field of Search ................ 73/552, 555, 556, 557, 73/558, 67; 330/52; 179/1 N

[56] References Cited

U.S. PATENT DOCUMENTS

| 2,836,656 | 5/1958 | Schultz | 73/557 |
| 2,997,668 | 8/1961 | Nolle | 330/52 |
| 3,154,170 | 10/1964 | Noiseux | 73/552 |
| 3,964,319 | 6/1976 | Fletcher | 73/557 |

*Primary Examiner*—Richard C. Queisser
*Assistant Examiner*—Stephen A. Kreitman
*Attorney, Agent, or Firm*—Howard J. Osborn; William H. King; John R. Manning

[57] ABSTRACT

This invention is a device for measuring small differences between relatively high sound pressure levels at two different microphone sites. It provides electrical insertion voltages, "pilot" voltages, as a means for continuously monitoring the gains of two acoustical channels. The difference between two pilot voltages is utilized to force the gain of one channel to track the other channel.

4 Claims, 10 Drawing Figures

DIFFERENTIAL SOUND LEVEL METER

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 USC 2457).

BACKGROUND OF THE INVENTION

The invention relates generally to devices for measuring sound pressure levels and more specifically concerns devices for measuring small differences between relatively high sound pressure levels at two different microphone sites.

Previous methods and devices for measuring the difference between two sound pressure levels include the gradient microphone and the measurement of absolute sound pressure levels over independent acoustical channels.

A gradient microphone measures the difference between instantaneous sound pressures over a distance much less than an acoustical wavelength. It has the disadvantage that it will not measure the difference between peak sound pressures over a distance comparable to or greater than an acoustical wavelength. The disadvantage of measuring the absolute sound pressure levels over independent acoustical channels is that conventional microphone systems are not sufficiently stable to resolve small differences in sound pressure levels.

It is therefore a primary object of this invention to provide a device for measuring small differences between relatively high sound pressure levels at two different microphone sites with greater precision than has been done in the past. Another object of this invention is to provide a device for measuring the difference between peak sound pressures over a distance comparable to or greater than an acoustical wavelength.

A further object of this invention is to provide means for compensating against changes in the sensitivity of one acoustical channel relative to another acoustical channel.

Other objects and advantages of this invention will become apparent in the following specification and drawings.

SUMMARY OF THE INVENTION

The invention consists of three basic components: a first carrier channel, a second carrier channel and a differential output stage. The two acoustical pressures whose difference is to be obtained are applied to condenser microphones in the first and second carrier channels. Each of the carrier channels produces a voltage proportional to the acoustical pressure applied to it. The output voltages from the two carrier channels are applied to the differential output stage which produces a voltage proportional to the difference between these two voltages.

A local oscillator in the differential output stage generates two pilot voltages that are equal in amplitude but 180° out of phase. These two pilot voltages are inserted into the first and second carrier channels. The outputs of the first and second carrier channels resulting from the pilot voltages are compared in the differential output stage. If there is a difference, the difference is used to control a variable attenuator in the differential output stage to decrease the difference to zero. Hence the gains of the two channels are forced to remain equal even though the gains of the two channels will be continuously changing, primarily because the responses of the condenser microphones are highly sensitive to variations in ambient conditions.

DETAILED DESCRIPTION OF THE INVENTION

Figure 1:
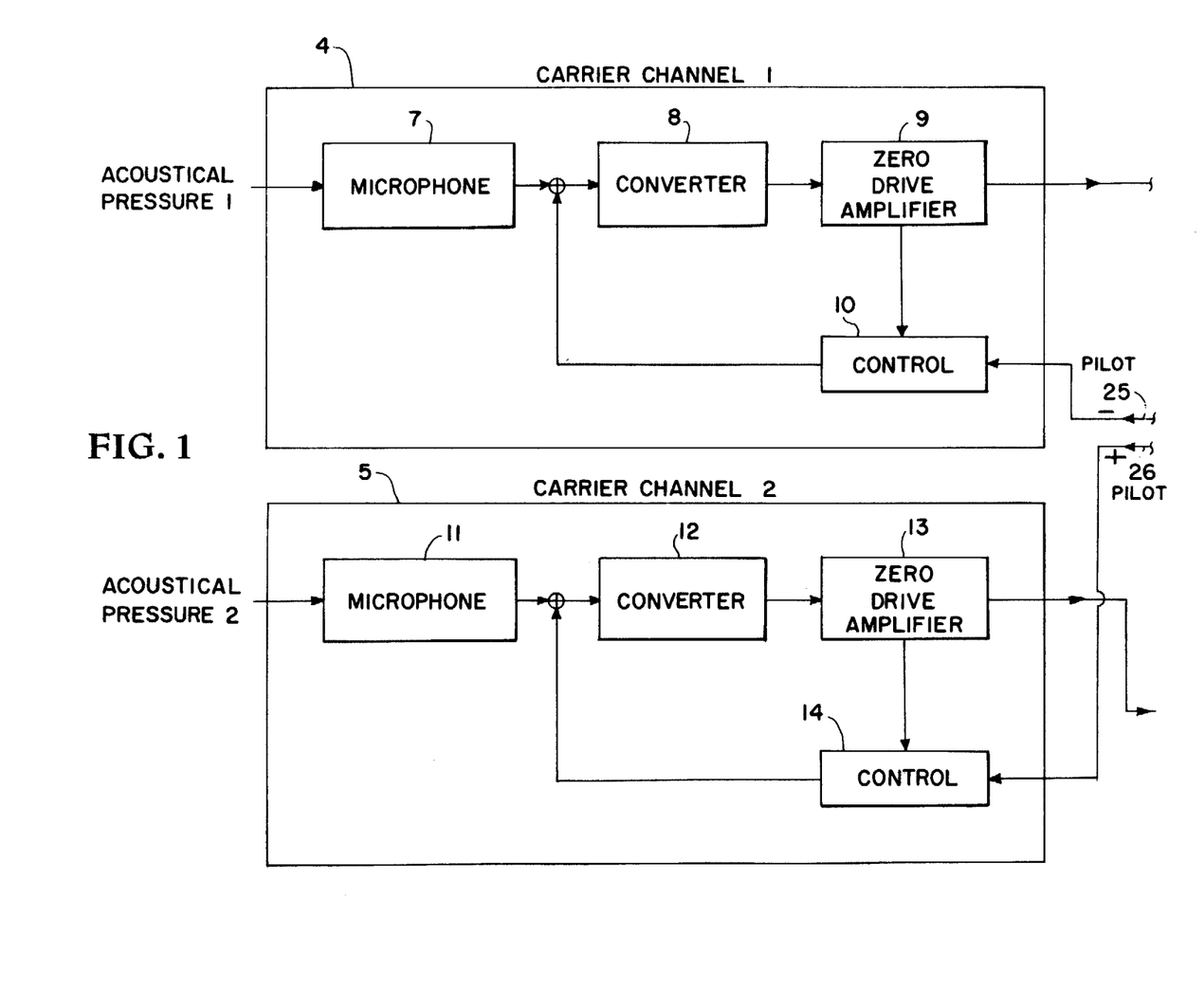
FIGS. 1 and 1a are a block diagram of the embodiment of the invention selected for illustration in the drawings.
Figure 1A:
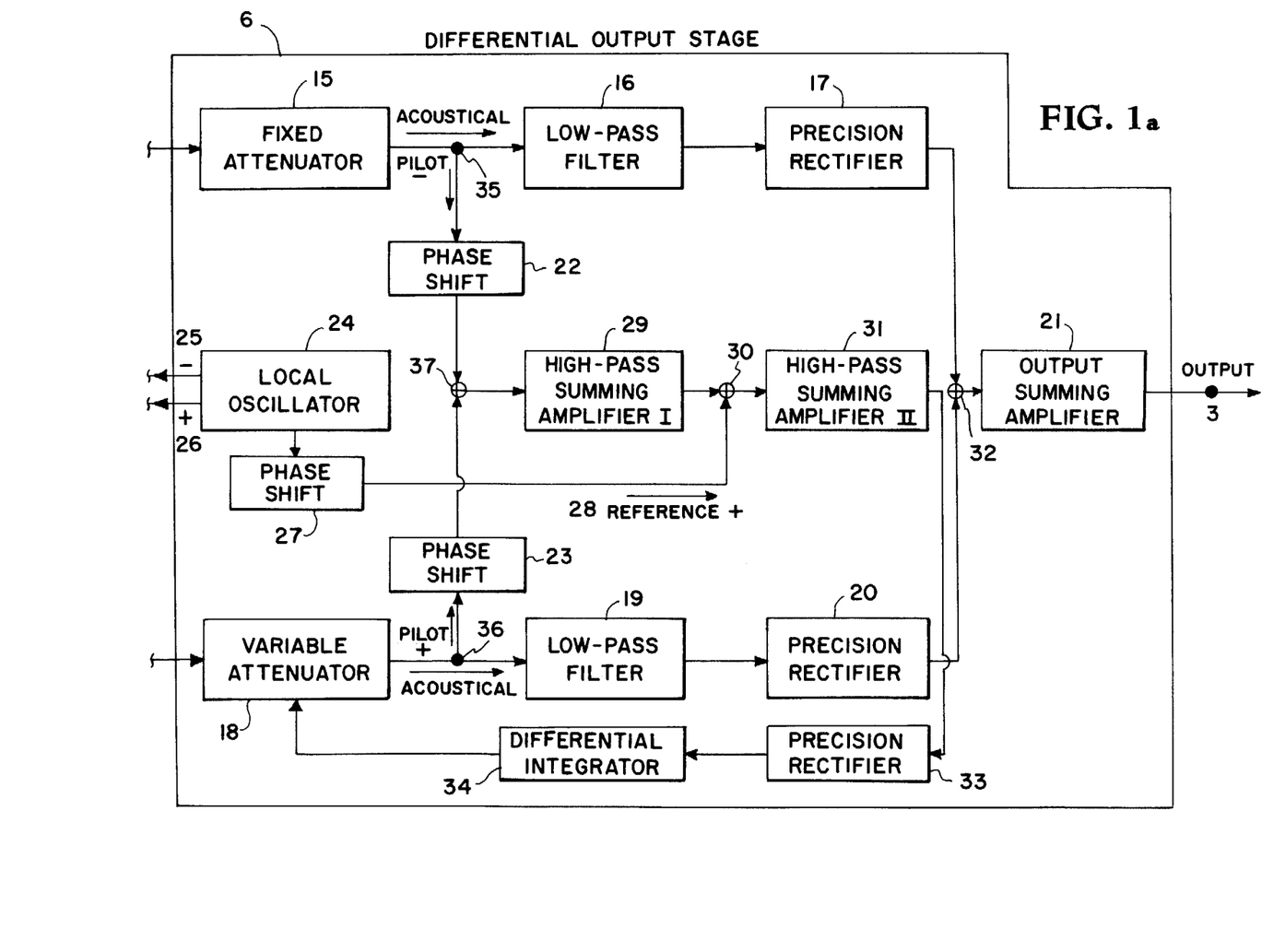

Turning now to the embodiment of the invention selected for illustration in the drawings, FIGS. 1 and 1a show a block diagram of the complete instrument, which consists of three basic components: carrier channel 1 designated by the numeral 4, carrier channel 2 designated by the numeral 5, and the differential output stage 6.

Carrier channels 1 and 2 are described in U.S. Pat. Nos. 3,868,856 and 3,964,319. The function of a carrier channel is to convert an instantaneous acoustical pressure into an analog electrical signal. In channel 1 an acoustical pressure 1, within the frequency band 1 to 5 kHz, causes variations in the capacitance of a condenser microphone 7. A converter 8 produces an electrical current proportional to the instantaneous change in microphone capacitance. A zero drive amplifier 9 produces an output voltage proportional to the converter current. A control circuit 10 serves two purposes. First it automatically keeps the converter optimally tuned to the carrier frequency and thus compensates against long-term drift in the static capacitance of the microphone. Secondly, it permits calibration of the carrier channel by means of an insertion voltage, which produces a signal at the output of the zero drive amplifier similar to that generated by the presence of sound at the microphone. In channel 2, an acoustical pressure 2, a condenser microphone 11, a converter 12, a zero drive amplifier 13, and a control circuit 14 fulfill the same roles as their counterparts in channel 1.

The differential output stage 6 consists of a fixed attenuator 15, a variable attenuator 18, low-pass filters 16 and 19, precision rectifiers 17 and 20, an output summing amplifier 21, phase shift networks 22, 23, and 27, a local oscillator 24, a high-pass summing amplifier stage I 29, a high-pass summing amplifier stage II 31, a precision rectifier 33, and a differential integrator 34. The acoustical signal at the output of zero drive amplifier 9 passes through the fixed attenuator 15, low-pass filter 16, and precision rectifier 17, at which output appears a positive direct voltage prportional to the incident acoustical pressure of channel 1. The acoustical signal at the output of zero drive amplifier 13 passes through the variable attenuator 18, low-pass filter 19, and precision rectifier 20, at which output appears a negative direct voltage proportional to the incident acoustical pressure of channel 2. The precision rectifier outputs are summed at the input 32 of the output summing amplifier 21. The output voltage 3 of the output summinhg amplifier is proportional to the difference between the acoustical pressures at microphones 7 and 11.

In general, the gains of the two carrier channels will be continuously changing, primarily because the response of a condenser microphone is highly sensitive to variations in ambient conditions. The invention incorporates automatic gain regulation to lock the gain of channel 2 to that of channel 1 at all times. The regulating mechanism is based upon the insertion of pilot voltages of equal magnitude into the two carrier channels and comparing their magnitudes at the outputs of the attenuators. The difference between pilot voltages is used to regulate the variable attenuator 18 of channel 2.

The local oscillator 24 generates the pilot voltages, typically at 17 kHz, whereby the signals entering the two carrier channels are 180° out of phase with each other. The phases will be referred to as "positive" and "negative," respectively. The oscillator also provides a reference voltage 28, of positive phase at the input terminal 30 of the second stage 31 of the high-pass summing amplifier, which is subsequently rectified and used to establish the reference attenuation of the variable attenuator 18 for the matched condition. The negatively phased pilot signal 25 of channel 1 is applied to the "calibration" input (see U.S. Pat. No. 3,868,856) of the control circuit 10 and passes through the converter 8, zero drive amplifier 9, fixed attenuator 15, and phase shift network 22. The positively phased pilot signal 26 of channel 2 is applied to the "calibration" input of the control circuit 14, and passes through the converter 12, zero drive amplifier 13, variable attenuator 18, and phase shift network 23. The two pilot signals are summed at the input terminal 37 of the first stage 29 of the high-pass summing amplifier where they are phase-inverted. The negatively phased pilot signal 25 of channel 1 after inversion adds to the reference signal 28; the positively phased pilot signal 26 of chanel 2 subtracts from it. The pilot signals are summed to the reference signal at the input terminal 30 of the second stage 31 of the high-pass summing amplifier. The composite signal is rectified in the precision rectifier 33 and applied to the input of the differential integrator 34, at which output a direct voltage controls the level of attenuation of the variable attenuator 18. The phase shift networks 22, 23 and 27 permit precise adjustment of the phases of the pilot and reference signals relative to one another.

If the pilot signals 25 and 26 are equal at summing point 37 they cancel, the reference signal 28 alone controls the variable attenuator 18, and the two channels are matched. An increase in the pilot signal 25 of channel 1 tends to increase the output of the variable attenuator; an increase in the pilot signal 26 of channel 2 tends to decrease it. The response to a change in either pilot signal is directed toward a compensating change at the output of the variable attenuator 18. The differential integrator 34 drives the variable attenuator until the difference in pilot signals in zero.

The high-pass summing amplifier 29 and 31, having a lower limiting frequency of typically 15 kHz, passes the 17 kHz pilot signals but blocks the 1 to 5 kHz acoustical signals. The low-pass filters 16 and 19, having an upper limiting frequency of typically 6 kHz, pass the acoustical signals but block the pilot signals. Because of the fluctuating nature of the incident acoustic pressure levels in some applications, the precision rectifiers 17 and 20 are designed to pass modulating frequencies up to 200 Hz.

It is emphasized that the component blocks of the differential output stage are made up of conventional electronic circuits, and that the novelty of the instrument lies in their function and arrangement, but not their construction.

Figure 2:
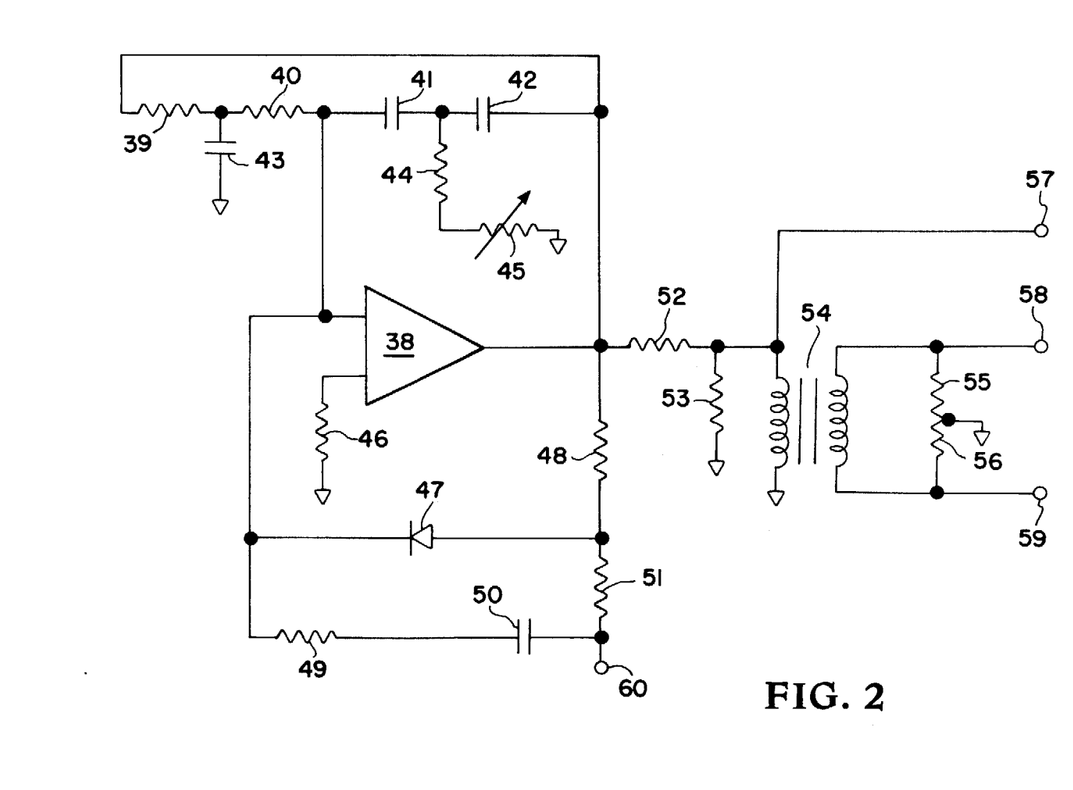
FIG. 2 is a schematic drawing of an oscillator suitable for use in the invention.

The local oscillator 24, shown in FIG. 2, is a "twin-tee" oscillator, which generates the 17 kHz pilot signals. The basic oscillator consists of operational amplifier 38, resistors 39, 40, 44, 45, 46, 48, 49, and 51, capacitors 41, 42, 43 and 50, and diode 47; its operation is described on page 68 of George A. Philbrick Researchers, Inc., Applications Manual for Computing Amplifiers, Nimrod Press, Inc., Boston 1966. In addition, the voltage divider consisting of resistors 52 and 53 is used to provide the proper reference voltage at point 57. Transformer 54, together with resistors 55 and 56, provide the pilot voltages of opposite phase at the inputs 58 and 59 to the control networks of channels 1 and 2, respectively.

Figure 3:
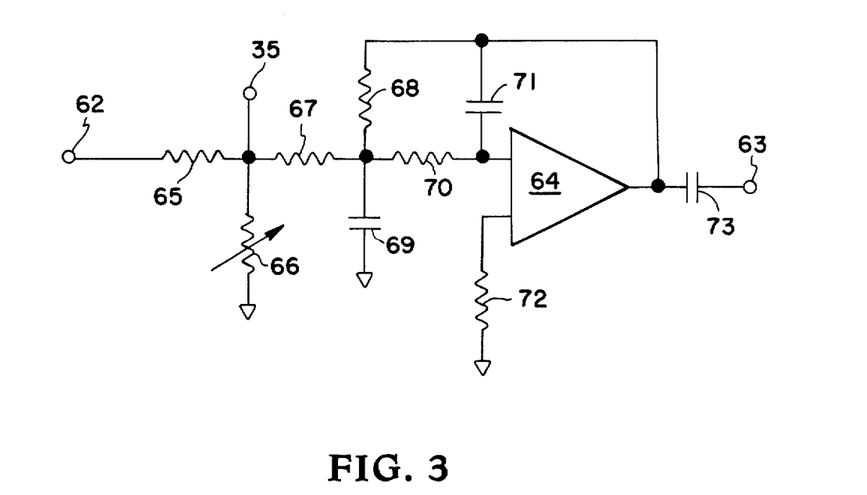
FIG. 3 is a schematic drawing of a fixed attenuator and low-pass filter suitable for use in the invention.

The fixed attenuator 15 and low-pass filter 16 are combined in one circuit, as shown in FIG. 3. Both the acoustical and pilot signals at the output of zero drive amplifier 9 are applied to input terminal 62. The voltage divider network consisting of fixed resistor 65 and variable resistor 66 permit adjustment of the level of the negatively phased pilot signal at terminal 35. Operational amplifier 64, together with resistors 67, 68 and 70, and capacitors 69 and 71, makes up a two-pole low-pass Butterworth filter, which blocks the pilot signal but passes the acoustical signal and permits the latter to reach the input terminal 63 of precision rectifier 17. Resistor 72 compensates against initial input offset voltage, and capacitor 73 prevents d.c. coupling to succeeding stages.

Figure 4:
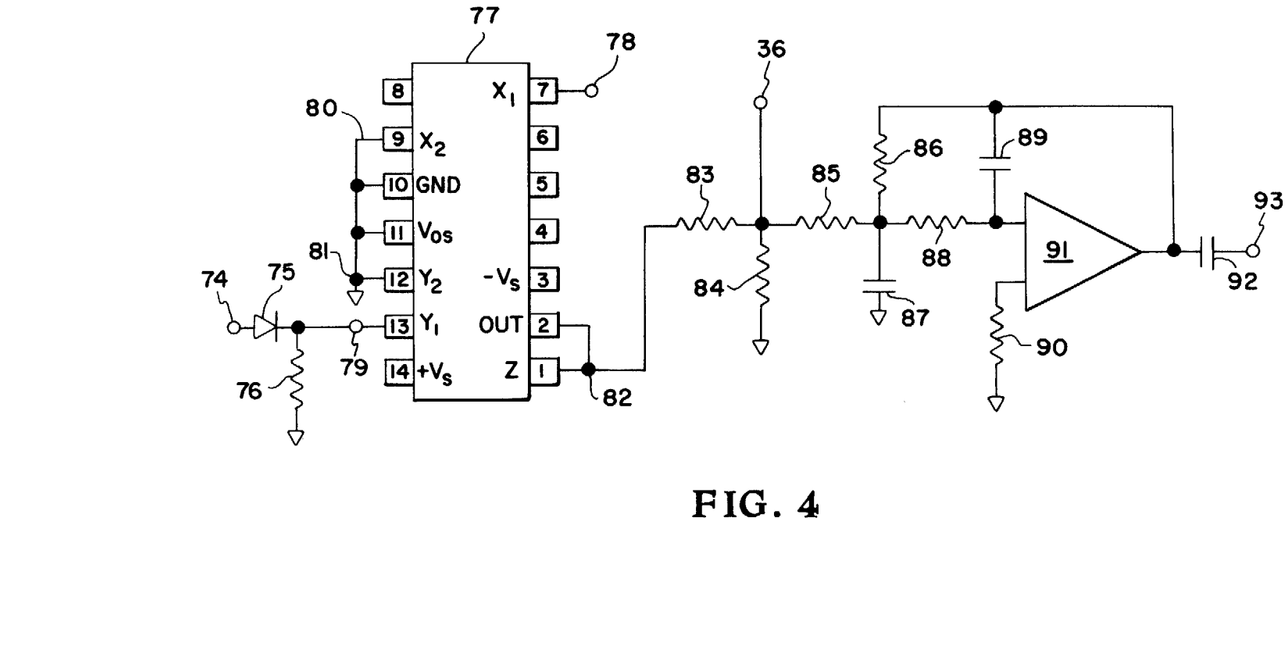
FIG. 4 is a schematic drawing of a variable attenuator and low-pass filter suitable for use in the invention.

The variable attenuator 18 and low-pass filter 19 are also combined in one circuit as shown in FIG. 4. Element 77 is an integrated circuit multiplier, having the response $$V_{out} = (X_1 - X_2)(Y_1 - Y_2)/10 \text{ volts}$$

where $X_1$, $X_2$, $Y_1$, and $Y_2$ are input voltages applied to terminals 78, 80, 79, and 81, respectively, and $V_{out}$ the output voltage at terminal 82. In the present application $X_2$ and $Y_2$ are connected to common; thus $V_{out}$ is proportional to the product $X_1 Y_1$. Voltage $Y_1$, the d.c. output of the differential integrator 34, determines the level of attenuation of voltage $X_1$, the output of zero drive amplifier 13 at terminal 78. Diode 75 prevents $Y_1$ from becoming negative, an event which would lead to instability in the automatic gain regulating loop. Resistor 76 rovides a ground-return for the diode current. Resistors 83 and 84 comprise a voltage divider to set the level of the positively phased pilot signal at terminal 36. Operations amplifier 91, together with resistors 85, 86, and 88 and capacitors 87 and 89, makes up a two-pole low-pass Butterworth filter (see Burr-Brown Research Corporation, Handbook of Operational Amplifier Active RC Networks, First Edition 1966, page 74), which blocks the pilot signal but passes the acoustical signal and permits the latter to reach the input terminal 93 of precision rectifier 20. Resistor 90 compensates against initial offset voltage, and capacitor 92 prevents d.c. coupling to succeeding stages. Information concerning the pin connections of multiplier 77 can be found in Analog Devices, Inc., Product Guide 1975, page 162.

Figure 5:
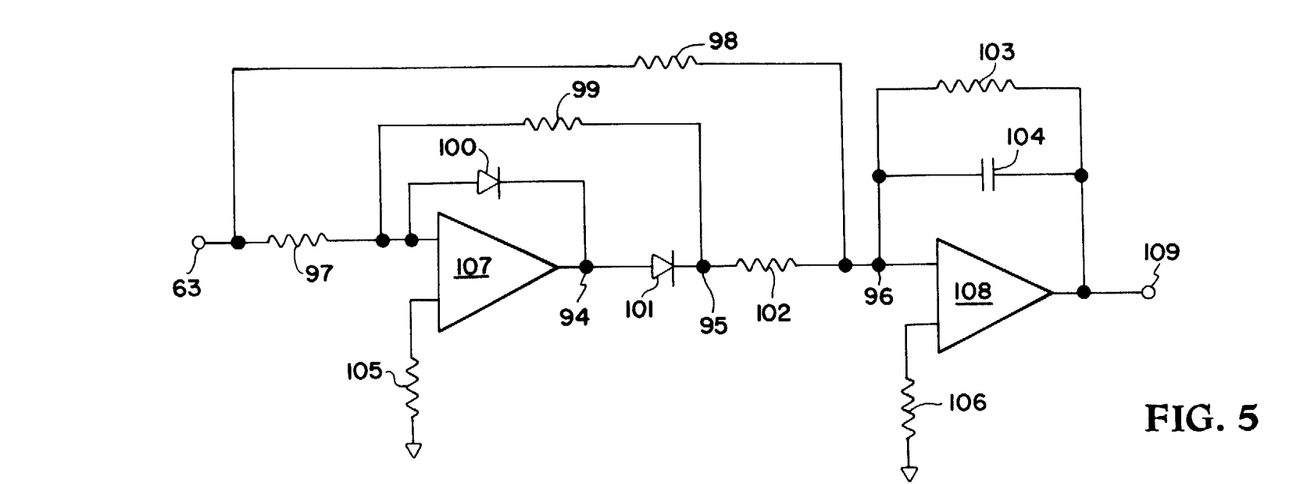
FIG. 5 is a schematic drawing of a precision rectifier circuit suitable for use in the invention.

The precision rectifier circuit 17, shown in FIG. 5 is a modification of the "precision Absolute-Value Circuit," described on page 58 of above-referred to George A. Philbrick Research, Inc., reference. A direct voltage appears at the output, terminal 109, proportional to the peak values of the time-varying voltage appearing at terminal 63, the output of low-pass filter 16. The circuit consists of operational amplifiers 107 and 108, resistors 97, 98, 99, 102, 103, 105, and 106, and diodes 100 and 101. The modification consists of the addition of capacitor 104, which filters the full-wave rectified voltage appearing at point 96. In the present application the time constant of the resistor 103-capacitor 104 parallel combination is chosen to pass modulating frequencies up to 200 Hz. Precision rectifier circuit 20 is identical to the circuit shown in FIG. 5, except that the direction of diodes 100 and 101 is reversed.

Figure 6:
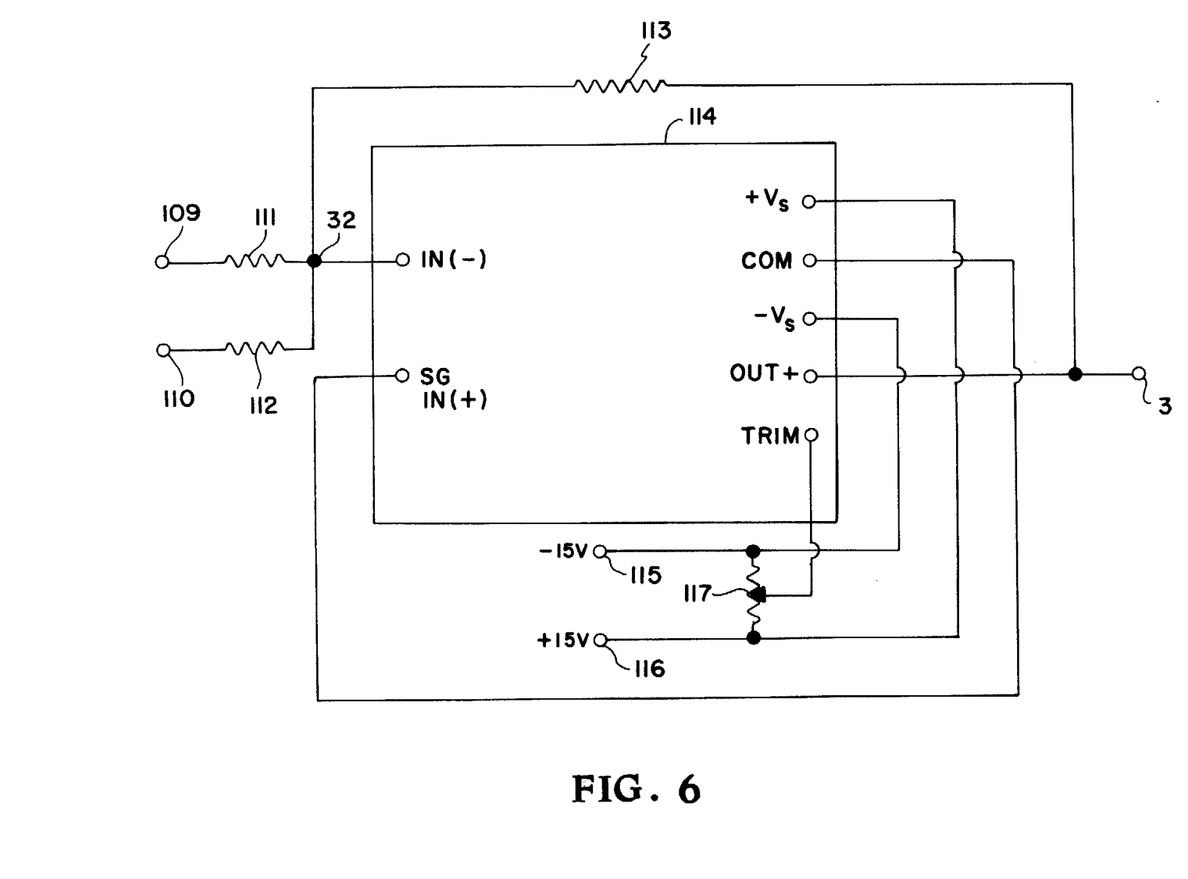
FIG. 6 is a schematic drawing of an output summing amplifier suitable for use in the invention.

The output summing amplifier 21 of FIG. 6 utilizes a chopper-stabilizer amplifier 114, described on page 44 of the Analog Devices, Inc., reference cited above, in order to minimize d.c. drift in the differential output volage at terminal 3. Terminals 109 and 110 are the output terminals of precision rectifiers 17 and 33, respectively, and 32 is the summing point. Resistors 111 and 112 are the input resistors of channels 1 and 2 respectively and resistor 113 the feedback resistor. Variable resistor 117, connected between the −15 V and +15 V supply voltages at terminals 115 and 116 respectively, is used to trim the output voltage to zero when the input voltages are zero.

Figure 7:
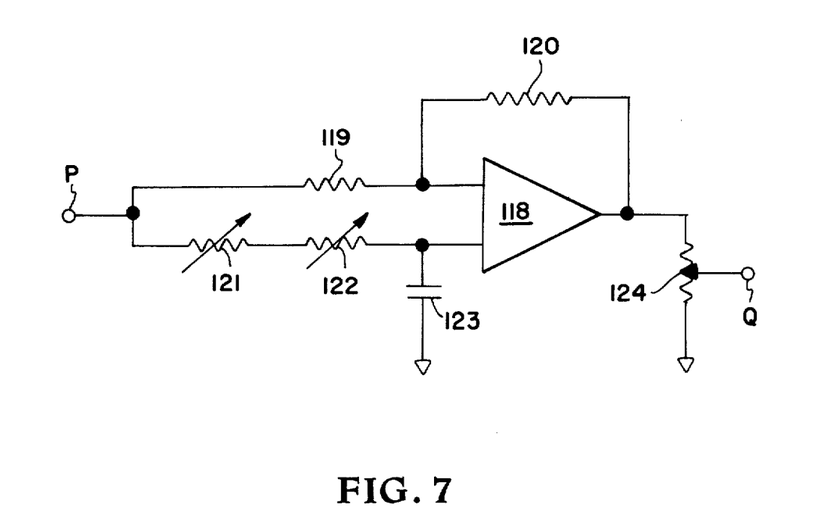
FIG. 7 is a schematic drawing of a phase shift network suitable for use in the invention.

The phase shift networks 22, 23, and 27, shown in FIG. 7, are identical. The principle of operation and the function of resistors 119, 120, 121, and 122, capacitor 123, and operational amplifier 118 are described on page 47 of the above-referred to George A. Philbrick Research, Inc., reference. The phase difference between sinusoidal signals at the output (terminal Q) and the input (terminal P) can be adjusted approximately between 0° and 180°. Variable resistors 121 and 122 permit coarse and fine adjustment of the phase shift respectively. When these resistances are zero the phase shift is 0°; as they approach maximum values, the phase shift approaches 180°. Variable rsistor 124 permits adjustment of the output amplitude. Input terminal P and output terminal Q correspond to the circuit points indicated as follows:

| Phase Shift Network | Input Terminal P | Output Terminal Q |
|---|---|---|
| 22 | 35 of fixed attenuator 15 | 125 of high-pass summing amplifier 29 |
| 23 | 36 of fixed attenuator 18 | 126 of high-pass summing amplifier 29 |
| 27 | 57 of local oscillator 24 | 127 of high-pass summing amplifier 29 |

Figure 8:
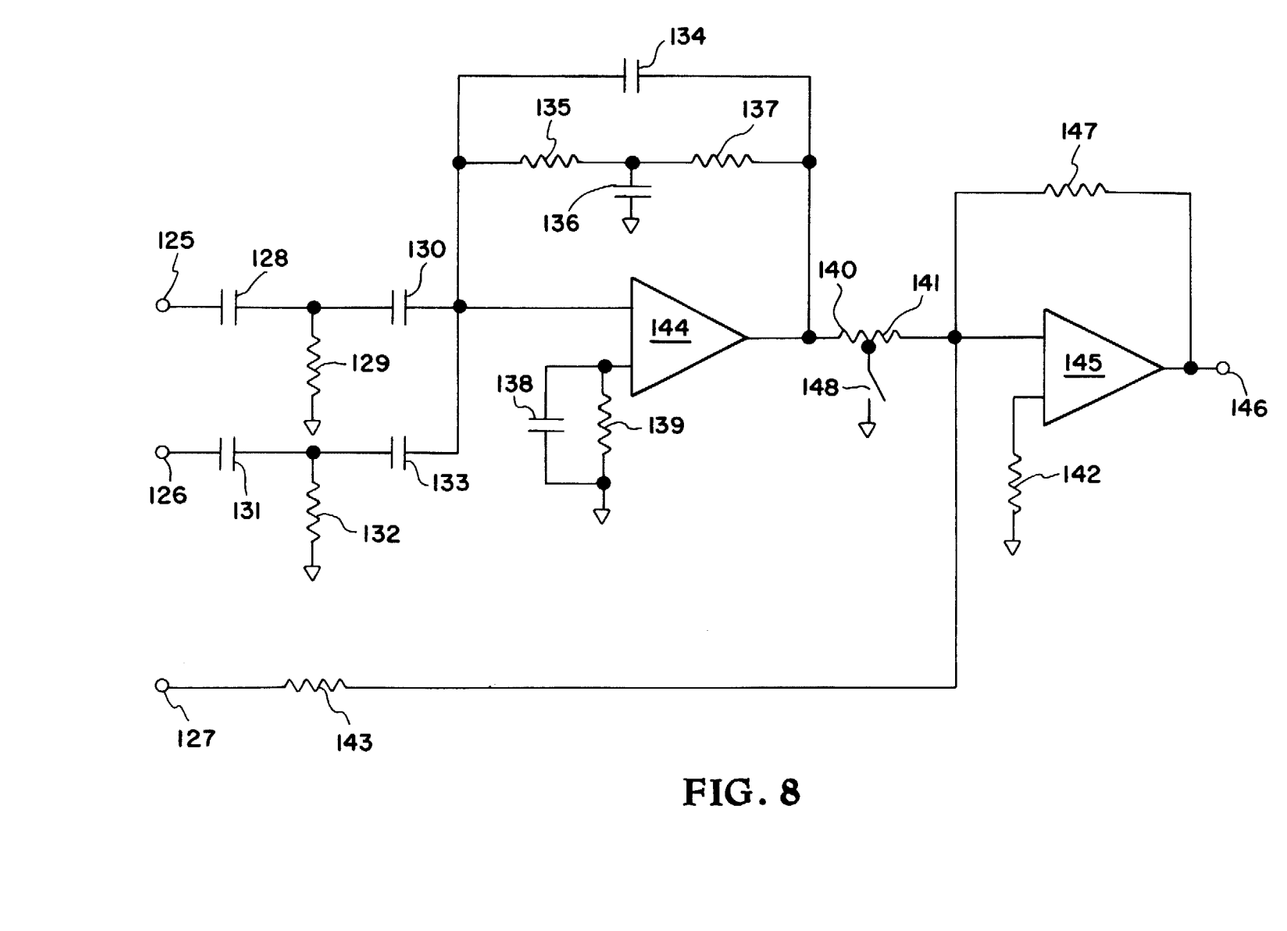
FIG. 8 is a schematic drawing of a high-pass summing amplifier suitable for use in the invention.

Both stages of the high-pass summing amplifier 29 and 31 are shown in FIG. 8. Stage I, consisting of operational amplifier 144, resistors 129, 132, 135, 137, and 139, and capacitors 128, 130, 131, 134, 136, and 138, is a two-pole high-pass Butterworth filter, described on page 70 of the above-referred to Burr-Brown Research Corporation reference. Capacitor 138 insures that this stage will not break out into oscillation. The negative and positive pilot voltages at the outputs of phase-shift networks 22 and 23 are applied to input terminals 125 and 126, respectively, then summed at the input of operational amplifier 144. Switch 148 is provided to short out the output of the first stage during initial adjustment of the regulating loop to balance the channel gains. Stage II, consisting of operational amplifier 145 and resistors 140, 141, 142, 143 and 144, provides an output proportional to the sum of the two pilot voltages and reference voltage at point 30. Resistors 140, 141, and 143 serve as summing resistors, 144 as the feedback resistor, and 142 as the offset-voltage compensating resistor, respectively.

Figure 9:
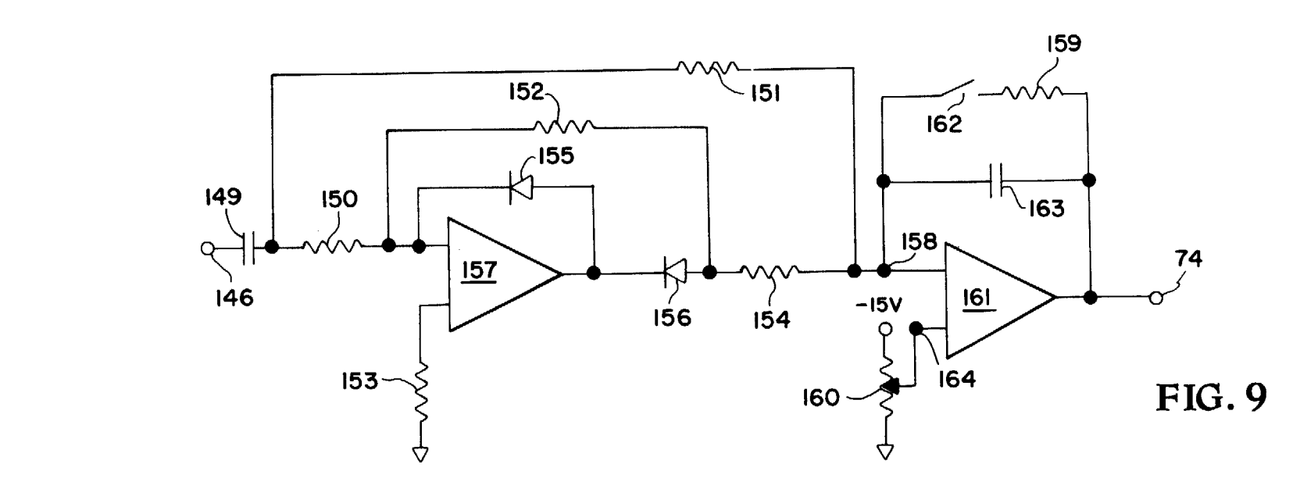
FIG. 9 is a schematic drawing of a precision rectifier and differential integrator suitable for use in the invention.

The precision rectifier 33 and differential integrator 34, combined in the single circuit of FIG. 9, comprise a modified version of the precision rectifier circuit of FIG. 5. The first stage is a full-wave rectifier consisting of operational amplifier 157, diodes 155 and 156, resistors 150, 151, 152, 153, and 154 and capacitor 149. The second stage, the differential integrator, consists of operational amplifier 161, fixed resistor 159, variable resistor 160, connected to a negative direct voltage source, switch 162, and capacitor 163. The circuit of FIG. 9 differs from that of FIG. 5 in two respects: first the noninverting input terminal 164 of operational amplifier 161 is connected to an adjustable negative direct voltage, the differential reference voltage; secondly switch 162 in the feedback branch of the same operational amplifier permits operation as a filter (switch closed) or integrator (switch open). The output voltage at terminal 74 serves as the gate voltage of variable attenuator 18, and is proportional to the difference between the differential reference voltage at terminal 164 and the average value of the output of the high-pass summing amplifier at terminal 158. The voltage at terminal 164 determines the quiescent gate voltage at terminal 74. Capacitor 149 prevents d.c. coupling between the high-pass summing amplifier and precision rectifier. Switch 162 must be open once the gains of the two channels are initially balanced.

The following procedure is used to balance the two channels initially:

Adjust the tuning point of each converter for maximum gain and set the attenuation of each zero drive amplifier to a common desired level. Close switches 148 of the high-pass summing amplifier and 162 of the differential integrator to prevent all pilot voltages except the reference from completing the regulating loop. By mens of variable resistor 160 set the integrator reference voltage at point 162 to approximately 4 to 5 volts. By means of variable resistors 121, 122, and 124 of phase shift networks 22 and 23 adjust the pilot voltages for approximately 0.5 volts peak-to-peak amplitude and precise 180° phase difference at point Q of their rspective networks. A differential plug-in of a dual trace oscilloscope will prove useful for this purpose. By means of variable resistors 121 and 122 of phase shift network 27 adjust the phase of the reference pilot voltage at point Q to match that of phase shift network 23 precisely. By means of variable resistor 124 of phase shift network 27 adjust the input voltage at point 158 of the differential integrator so that its average value equals the integrator reference voltage at point 162. Open switches 148 and 162. Either excite microphones 7 and 11 with acoustic calibrators or insert calibration voltages into the "calibration" jacks of the control units 10 and 14, to provide equal acoustical signals 1 to 5 kHz at the input terminls 35 and 36 of low-pass filters 16 and 19, respectively. Adjust variable resistor 117 until the differential output voltage at terminal 3 is zero. The two channels are balanced and automatic gain regulations is operative.

Circuit elements that can be used in the invention are the following: resistors 65, 83, 84: 1K; 129, 132, 1.5K; 142: 51K; 45, 52, 55, 56, 66, 119, 120, 122, 143, 153, 160: 10K; 111, 112, 154: 10K 0.01%; 44, 105, 106: 12K; 150, 151, 152, 159: 20K, 0.01%; 70, 72, 88, 90, 140, 141: 22.1J; 97, 99, 102: 12K0.01%; 39, 40, 46: 27K; 67, 68, 85, 86: 39.2K; 48: 43K; 103: 47.5K; 117, 137: 50K; 98: 50K0.01%; 135, 92K; 49, 51, 53, 76, 113, 121, 124, 139: 100K; 147: 200K; all resistors are 1% fixed film (evaporated), except 0.01% resistors, which are fixed film (bulk). Capacitors: 135, 47 pf; 50: 220 pf; 41, 421, 123, 138; 330 pf; 71, 89: 470 pf; 43, 136: 660 pg; 59, 87: 2200 pf; 128, 130, 131, 133: 0.0022 μf; 104:0.03 μf; 149: 0.047 μf; 163: 1μf; 73, 92: 3.3 μf. Semiconducting devices: diodes 47, 75, 100, 101, 155, 156: 1N658; operational amplifiers 38, 64, 91, 118, 144, 145, 157, 161: AD201AH; chopper-stabilized operational amplifiers 107, 108: HA1904; 114: 233L; multiplier 77: AD532; transformer: 54: UTC-DIT.

Each of the circuits of the differential output stage can be replaced by an alternative circuit that performs the same function. Examples of alternative circuits are Hartly, Colpitts, phase-shift or crystal-controlled oscillators for the local oscillator 24, Bessel or Tchebysheff filters for the low-pass 16, 19, and high-pass 29 filters, a photorsistor or FET resistor for the variable attenuator 18, a full-wave diode bridge or transformer-coupled rectifier for the precision rectifiers 17, 20, 23. The differential reference voltage can be applied at terminal 81 of IC multiplier 77, in which case the integrator must be redesigned as single-ended. Additional high-pass filtering can be incorporated in stage II of the high-pass summing amplifier 31. And the pilot frequency can lie below the acoustical passband, as well as above.

Advantages of the invention over prior art are: it can measure small differences between sound pressure levels at two different microphone sites to greater precision than the prior art, and the automatic gain control, which forces the gain of one acoustical channel to track that of the other acoustical channel, renders the invention less sensitive to changes in ambient conditions than the prior art.

What is claimed is:

1. A device for measuring small differences between two relatively high sound pressure levels comprising:
    a first carrier channel means responsive to a first of said sound pressure levels for producing a first electrical signal proportional to said first sound pressure level;
    a second carrier channel means responsive to the second of said sound pressure levels for producing a second electrical signal proportional to said second sound pressure level;
    means receiving said first and second electrical signals for producing a third electrical signal that is proportional to the difference between said first and second electrical signals whereby said third electrical signal is proportional to the difference between said two sound pressure levels; said means including means for changing the amplitude of said first electrical signal and means for changing the amplitude of said second electrical signal the last said means including means responsive to an electrical signal for varying the amount of change;
    means for inserting equal amplitude electrical signals into said first and second carrier channels and for obtaining the difference between said equal amplitude insertions electrical signals after they have passed through said means for changing the amplitudes of said first and second electrical signals; and
    means for applying said difference between said equal amplitude insertion electrical signals to said means for varying the amount of change whereby the gain of the second channel is forced to follow the gain of the first channel.

2. A device for measuring small differences between two relatively high sound pressure levels according to claim 1 wherein said means for changing the amplitude of said first electrical signal is a fixed attenuator and said means for changing the amplitude of said second electrical signal is a variable attenuator.

3. A device for measuring small differences between two relatively high sound pressure levels comprising:
    a first carrier channel means responsive to a first of said sound pressure levels for producing a first electrical signal proportional to said first sound pressure level;
    a second carrier channel means responsive to the second of said sound pressure levels for producing a second electrical signal proportional to said second sound pressure level;
    each of said first and second carrier channel means comprising a condenser microphone whose capacitance is varied with its corresponding sound pressure level, a converter means for producing an electrical current proportional to the instantaneous change in microphone capacitance, a zero drive amplifier means for producing an output voltage proportional to said converter means current and a control circuit means for automatically keeping its corresponding said converter means optimally tuned to its carrier frequency and thus compensates against long-term drift in the static capacitance of said microphone;
    means receiving said first and second electrical signals for producing a third electrical signal that is proportional to the differenece between said first and second electrical signals whereby said third electrical signal is proportional to the difference between said two sound pressure levels said means including a fixed first attenuator receiving said output voltage from said zero drive amplifier means in said first carrier channel means, a variable second attenuator whose gain is varied by the amplitude of the voltage applied to it receiving said output voltage from said zero drive amplifier means in said second carrier channel means, and means for obtaining an electrical signal proportional to the difference between the outputs of said first and second attenuators; and
    means for generating two equal amplitude insertion voltages and for applying each to the control circuit means in a corresponding carrier channel, means for obtaining the difference voltage from the resulting outputs from said first and second attenuators and means for applying said difference voltage to said second attenuator to force the gain of the second channel to follow the gain of the first channel.

4. A device for measuring small differences between two relatively high sound pressure levels according to claim 3 including means for generating a third insertion voltage for adding to said difference voltage to establish a reference attenuation for said second attenuator.

* * * * *